(12) United States Patent
He et al.

(10) Patent No.: US 10,079,731 B2
(45) Date of Patent: Sep. 18, 2018

(54) CLIENT-SPACE NETWORK MONITORING

(71) Applicant: INTERNATIONAL BUSINESS MACHINES CORPORATION, Armonk, NY (US)

(72) Inventors: Ting He, Piermont, NY (US); Liang Ma, White Plains, NY (US); Erich M. Nahum, New York, NY (US); Mudhakar Srivatsa, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 220 days.

(21) Appl. No.: 14/949,646

(22) Filed: Nov. 23, 2015

(65) Prior Publication Data

US 2017/0149615 A1    May 25, 2017

(51) Int. Cl.
| | |
|---|---|
| *G06F 15/173* | (2006.01) |
| *H04L 12/24* | (2006.01) |
| *H04L 12/26* | (2006.01) |
| *G06F 9/00* | (2006.01) |
| *H04L 29/08* | (2006.01) |

(52) U.S. Cl.
CPC .............. *H04L 41/12* (2013.01); *G06F 9/00* (2013.01); *H04L 41/5009* (2013.01); *H04L 43/08* (2013.01); *H04L 41/5006* (2013.01); *H04L 41/5096* (2013.01); *H04L 67/1002* (2013.01)

(58) Field of Classification Search
CPC . H04L 41/12; H04L 41/5009; H04L 41/5006; H04L 41/5096; H04L 43/08; H04L 67/1002
USPC ......................................................... 709/224
See application file for complete search history.

(56) References Cited

U.S. PATENT DOCUMENTS

| | | | |
|---|---|---|---|
| 7,650,403 B2 | 1/2010 | Koetke et al. | |
| 8,077,718 B2 | 12/2011 | Mortier et al. | |
| 8,412,822 B1* | 4/2013 | Weinman, Jr. ........ | G06F 9/5027 709/201 |
| 2007/0073883 A1* | 3/2007 | Chafle ..................... | H04L 43/00 709/226 |
| 2015/0063152 A1 | 3/2015 | Chiang et al. | |
| 2016/0149831 A1* | 5/2016 | Lu ......................... | H04L 47/788 370/229 |

* cited by examiner

*Primary Examiner* — Wing F Chan
*Assistant Examiner* — Joseph Maniwang
(74) *Attorney, Agent, or Firm* — Tutunjian & Bitetto, P.C.; Jennifer R. Davis

(57) ABSTRACT

A method is provided for client-side monitoring in a cloud provider environment including a network having a plurality of nodes. The method includes estimating a logical topology of the network by clustering source-destination node pairs from among the plurality of nodes based on end-to-end performance measurements between various ones of the plurality of nodes. The method further includes estimating a performance state of the network for a client application based on end-to-end performance measurements. The method also includes at least one of scheduling and customizing a workload within the network based on the estimated logical topology and the estimated performance state of the network.

6 Claims, 12 Drawing Sheets

CLIENT-SPACE NETWORK MONITORING

GOVERNMENT RIGHTS

This invention was made with Government support under Contract No.: W911NF-06-30001 awarded by the U.S. Army. The Government has certain rights in this invention.

BACKGROUND

Technical Field

The present invention relates generally to information networks and, in particular, to client-space network monitoring.

Description of the Related Art

Cloud providers provide limited, infrequent views of network state, e.g., every 15 minutes. Such outdated information limits the value for client-side optimization. Thus, there is a need for more frequent views of network state which can provide value for client-side optimization.

SUMMARY

According to an aspect of the present principles, a method is provided for client-side monitoring in a cloud provider environment including a network having a plurality of nodes. The method includes estimating a logical topology of the network by clustering source-destination node pairs from among the plurality of nodes based on end-to-end performance measurements between various ones of the plurality of nodes. The method further includes estimating a performance state of the network for a client application based on end-to-end performance measurements. The method also includes at least one of scheduling and customizing a workload within the network based on the estimated logical topology and the estimated performance state of the network.

According to another aspect of the present principles, a method is provided for architecture-aware measurement-based network topology discovery in a cloud provider environment including a network having a plurality of nodes. The method includes obtaining a targeted network architecture for the network. The method further includes clustering the source-destination pairs formed by the plurality of nodes into at least two clusters based on end-to-end performance measurements between the source nodes and the destination nodes. The method also includes estimating a minimum logical network topology and assigning the sources nodes and the destination nodes from the pairs to nodes in the minimum logical topology based on clustering results from the end-to-end performance measurements. The method further includes augmenting the minimum logical topology to satisfy the targeted network architecture.

According to yet another aspect of the present principles, a method is provided for application-aware measurement-based performance state discovery in a cloud provider environment including a network having a plurality of nodes. The method includes identifying a performance-measurement-to-link relationship between end-to-end performance measurements and link performances. The end-to-end performance measurements are for various pairings of the plurality of nodes. The method further includes computing minimum link groups whose aggregate performances can be uniquely identified from the end-to-end performance measurements based on the relationship. The method also includes computing weights for each of the minimum link groups based on application-specified per-link weights. The method additionally includes collecting the end-to-end performance measurements between the various pairings of the plurality of nodes. The method further includes inferring an aggregate performance state of each of the minimum link groups. The method also includes performing at least one of workload scheduling, workload migration, and Service-Level Agreement violation detection, responsive to the inferred aggregate performance state of at least one of the minimum link groups.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to client-space network monitoring

In an embodiment, a client-space solution is provided to infer network topology and state, where the client-space solution leverages passive measurements from end-to-end performance between client nodes (servers).

Figure 1:
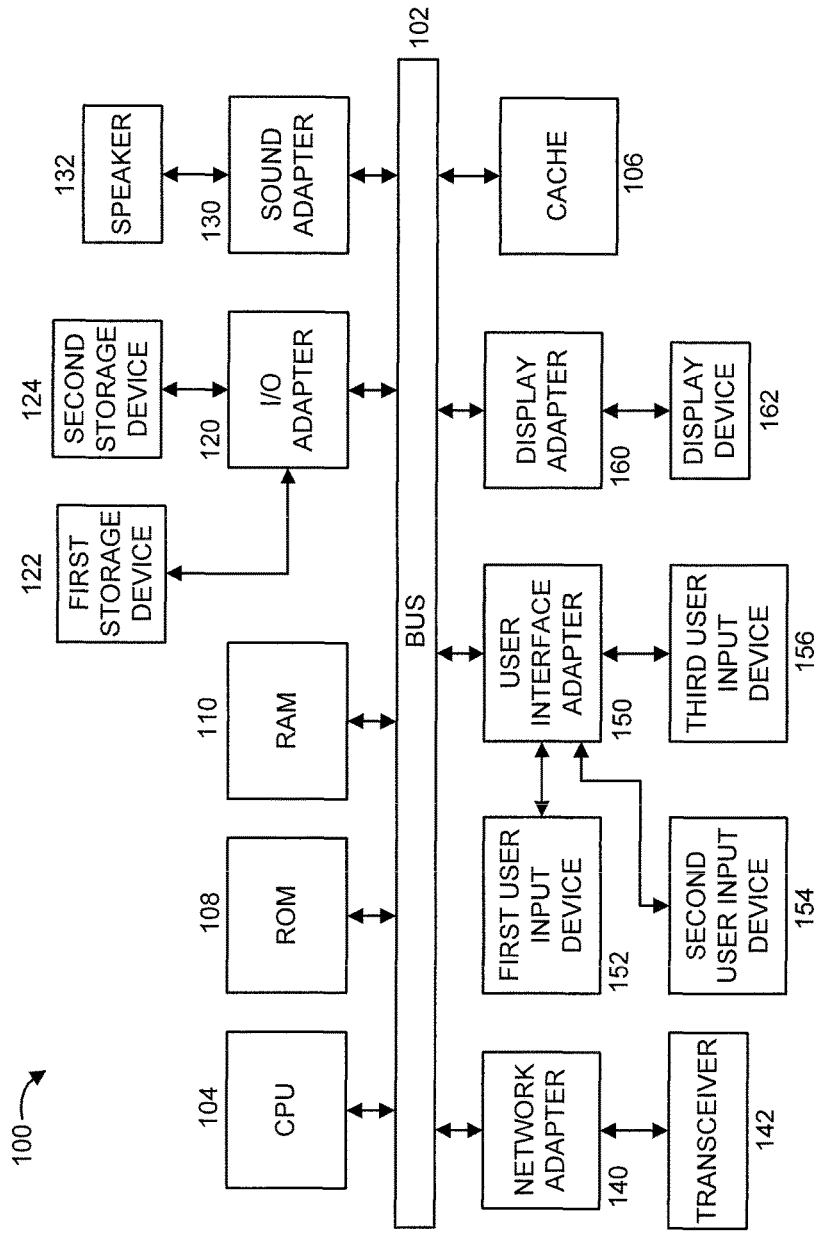
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that system 200, system 300, and system 400 described below with respect to FIGS. 2, 3, and 4, respectively, are systems for implementing respective embodiments of the present principles. Part or all of processing system 100 may be implemented in one or more of the elements of any of system 200, system 300, and system 400.

Figure 5:
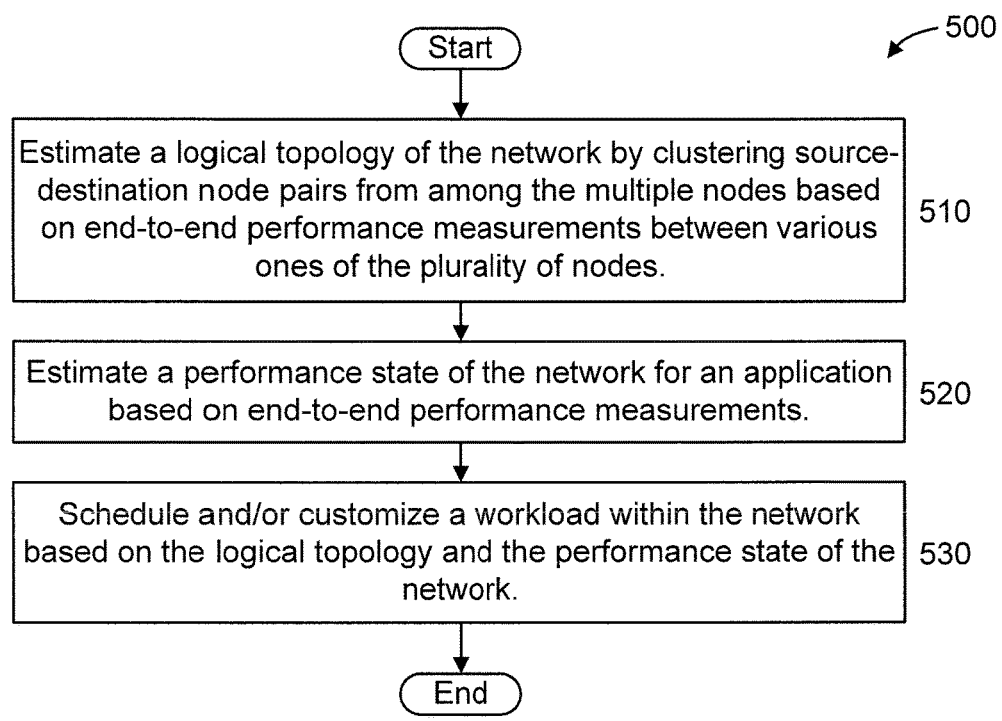
FIG. 5 shows a method 500 for client-space network utilization in a network having multiple nodes, in accordance with an embodiment of the present principles.
Figure 6:
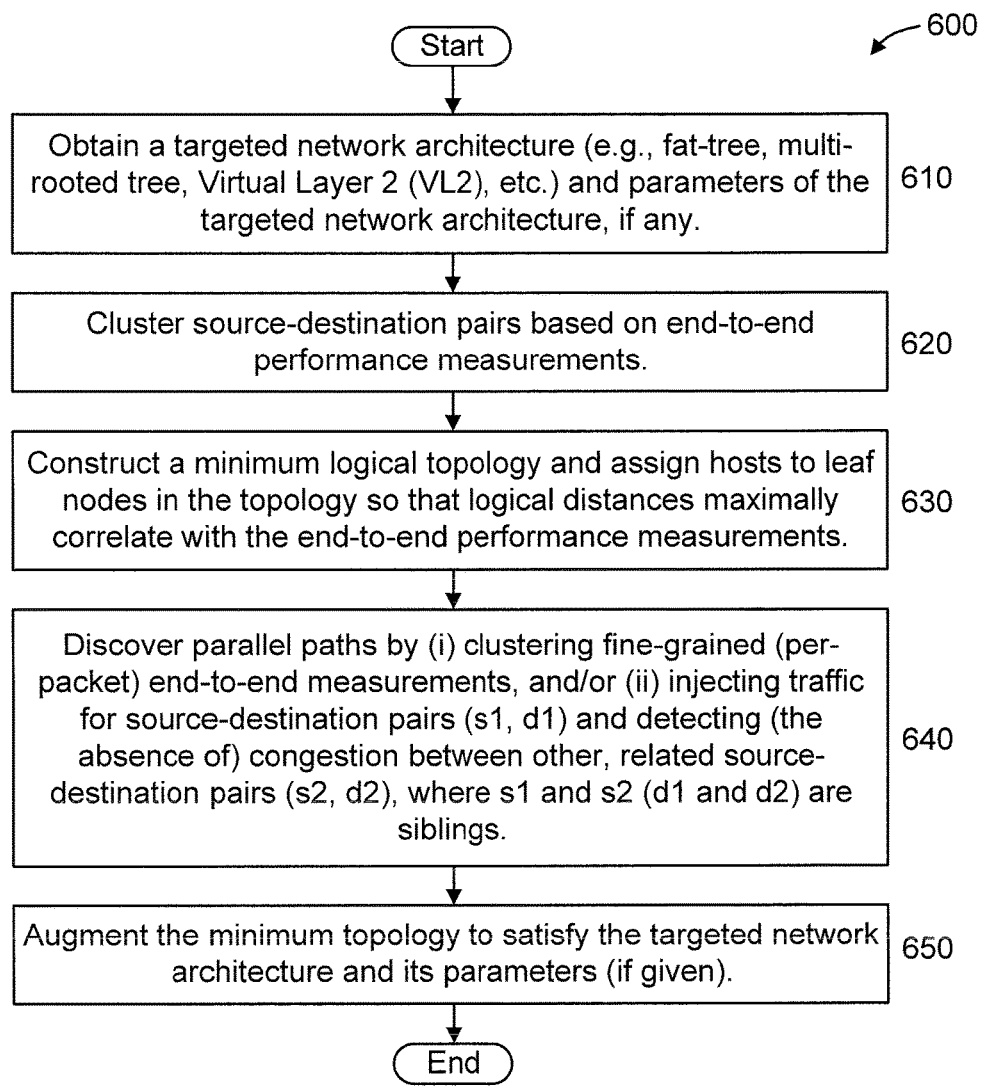
FIG. 6 shows an exemplary method 600 for constructing a logical topology for connecting client nodes based on similarity/dissimilarity between end-to-end performance measurements, in accordance with an embodiment of the present principles.
Figure 8:
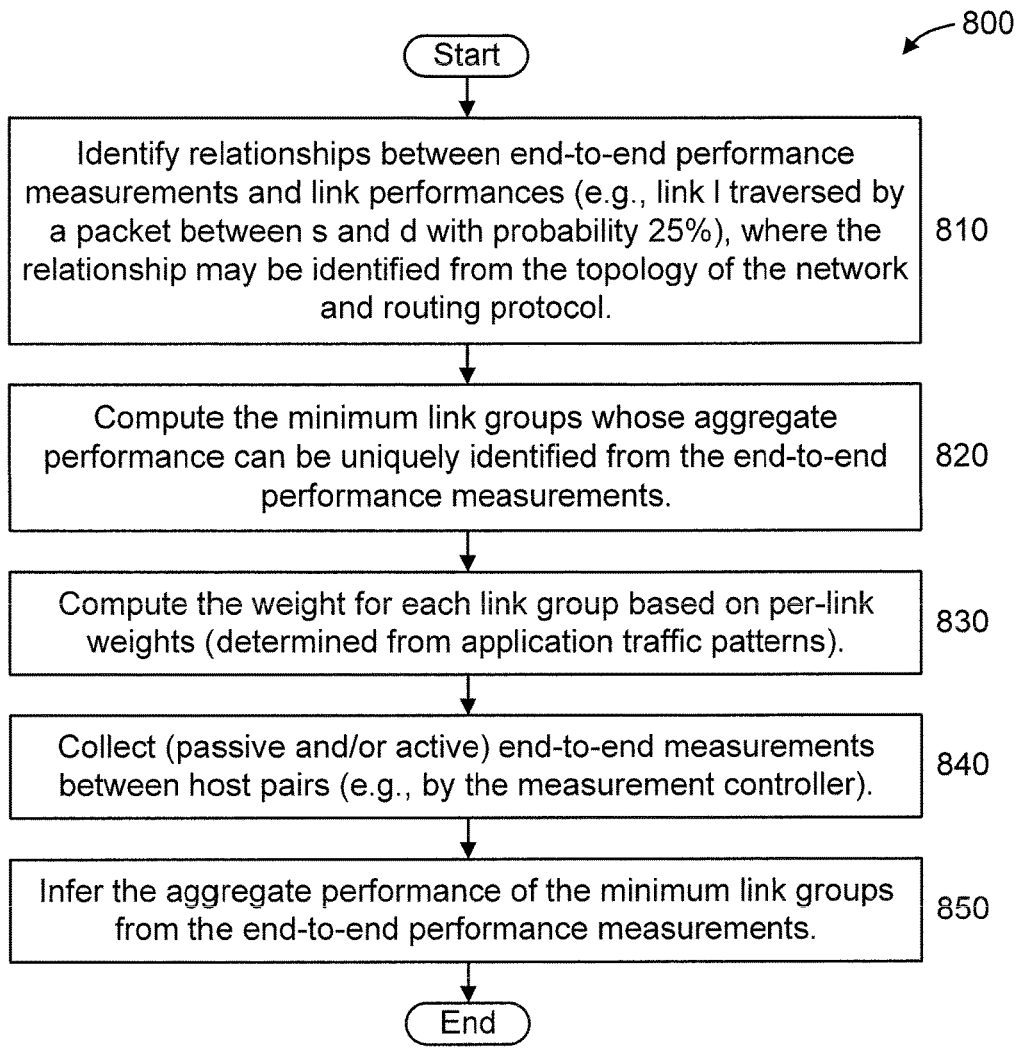
FIG. 8 shows an exemplary method 800 for inferring performance of minimum link groups from end-to-end measurements, considering the importance of client applications, in accordance with an embodiment of the present principles.

Further, it is to be appreciated that processing system 100 may perform at least part of the method described herein including, for example, at least part of method 500 of FIG. 5 and/or at least part of method 600 of FIG. 6 and/or at least part of method 800 of FIG. 8. Similarly, part or all of any of system 200, system 300, and system 400 may be used to perform at least part of method 500 of FIG. 5 and/or at least part of method 600 of FIG. 6 and/or at least part of method 800 of FIG. 8.

Figure 2:
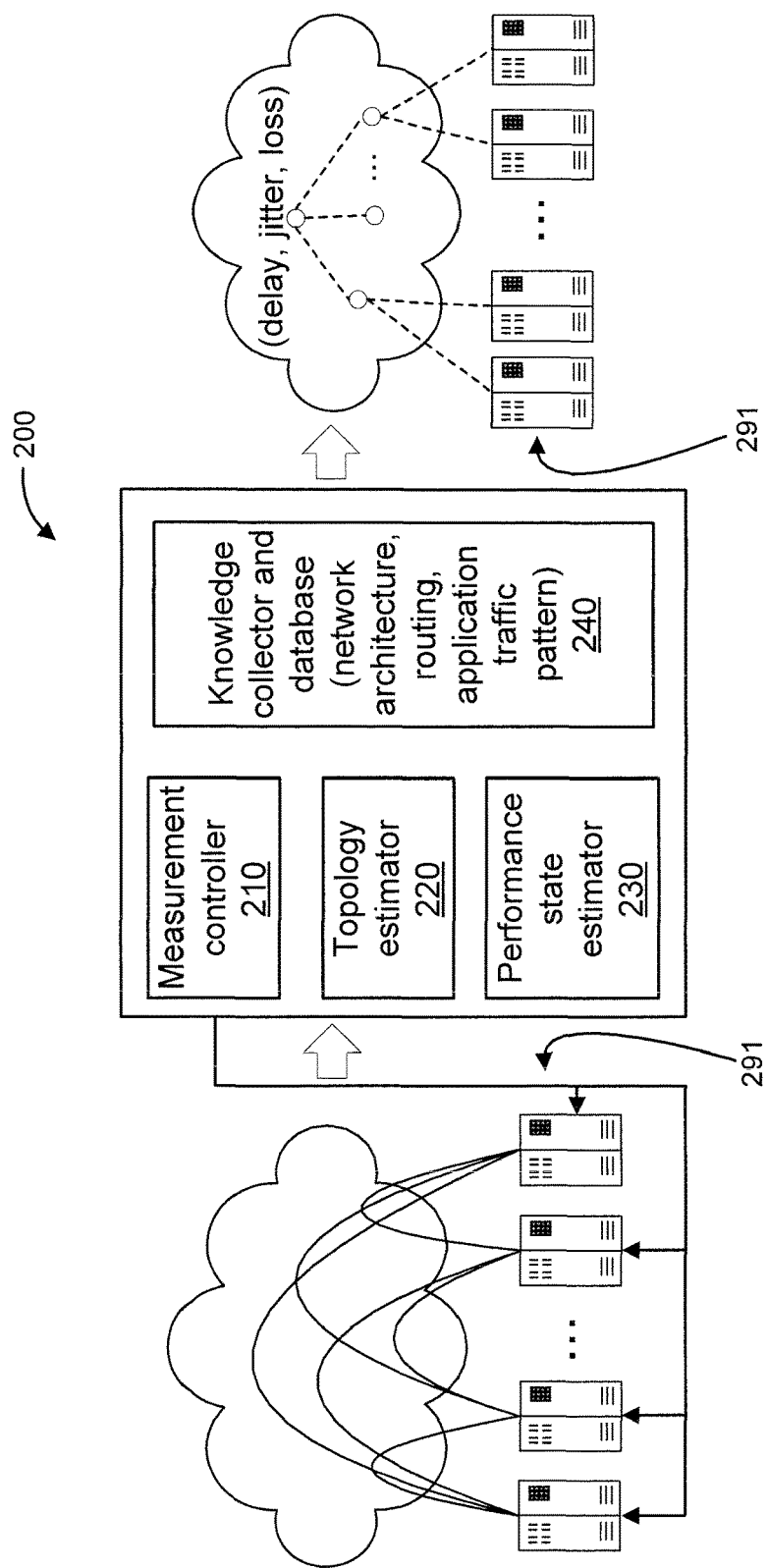
FIG. 2 shows an exemplary system 200 for client-space network monitoring, in accordance with an embodiment of the present principle.

FIG. 2 shows an exemplary system 200 for client-space network monitoring, in accordance with an embodiment of the present principles. The system 200 can be used in cloud provider environment that includes, for example, servers 191 as shown in FIG. 2. Moreover, other aspects of a cloud environment are further described with respect to at least FIGS. 10-12.

The system 200 includes a measurement controller 210, a topology estimator 220, a network performance state estimator 230, and a high-level knowledge collector and database 240. The system 200 is shown with respect to a set of servers 291 that are monitored in accordance with the teachings of the present principles. To that end, each of the servers 291 is shown connected to the measurement controller 210 on the left side of FIG. 1. On the right side of FIG. 1, some of the many exemplary types of parameters capable of being monitored by the measurement controller 210 are shown. These parameters include, but are not limited to, delay, jitter, loss (e.g., packet loss), and so forth.

The measurement controller 210 extracts measurements about performance of end-to-end traffic flows. The extracted measurements can include passive measurements and/or active measurements.

The topology estimator 220 constructs a logical topology of connecting client nodes according to a targeted network architecture based on similarity/de-similarity of end-to-end measurements.

The network performance state estimator 230 estimates network performance, for example, at the maximum possible resolution (i.e., minimum link groups), such that the estimate is guaranteed to be accurate when the number of end-to-end measurements grows large.

The high-level knowledge manager 240 describes high-level knowledge about the network, including (likely) architecture (e.g., multi-rooted tree), (likely) routing protocol, and (likely) traffic patterns. The collection of high-level knowledge can be performed by element 240 itself, or can be provided to element 240 for storage and reference. It is to be appreciated that the high-level knowledge manager 240 may be omitted in some embodiments of the present principles.

In the embodiment shown in FIG. 2, the elements thereof are interconnected by a bus(es)/network(s) (not shown). However, in other embodiments, other types of connections can also be used. Moreover, in an embodiment, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 2 can be implemented in a cloud configuration including, for example, in a distributed configuration. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present principles provided herein, while maintaining the spirit of the present principles. The preceding also applies to systems 300 and 400 described below with respect to FIGS. 3 and 4, respectively.

Figure 3:
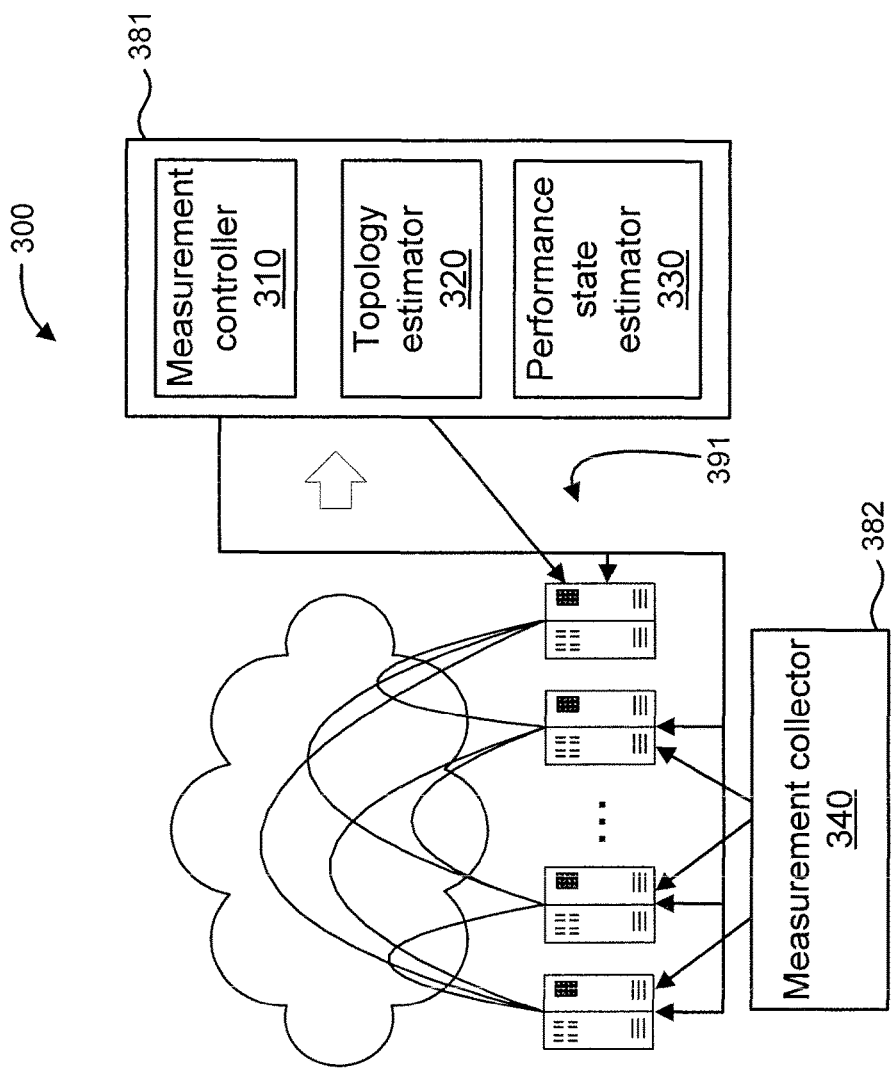
FIG. 3 shows an exemplary system 300 for client-space network monitoring using a master-slave architecture, in accordance with an embodiment of the present principles.
Figure 4:
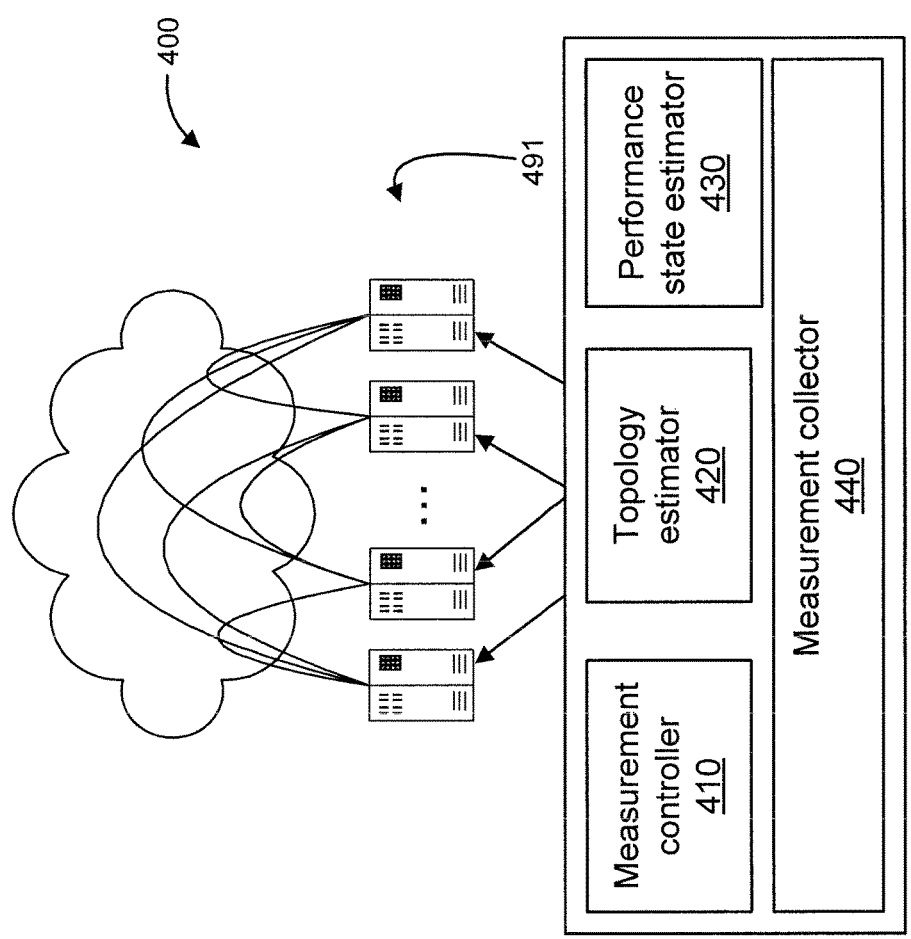
FIG. 4 shows an exemplary system 400 for client-space network monitoring using a peer-to-peer architecture, in accordance with an embodiment of the present principles.

It is to be appreciated that the elements in FIG. 2 can be deployed both as a monitoring cluster that includes a monitoring master and monitoring slaves (FIG. 3), and as a set of peer monitoring agents (FIG. 4).

FIG. 3 shows an exemplary system 300 for client-space network monitoring using a master-slave architecture, in accordance with an embodiment of the present principles. The architecture of system 300 is particularly suitable for, but not limited to, ad hoc clusters, and so forth.

System 300 includes a measurement controller 310, a topology estimator 320, a network performance state estimator 330, and a measurement collector 240. The elements 310, 320, and 330 of system 300 operate similarly to elements 210, 220, and 230, respectively, of system 200, but are configured in the master-slave architecture.

Thus, in the case of system 300, the measurement controller 310, the topology estimator 320, and the network performance state estimator 330 are implemented in a network monitoring master 381, while the measurement collector 340 is implemented as a network monitoring slave 382.

In an embodiment, the measurement collector 340 can be and/or otherwise include one or more of the following: a traffic sniffer; and a probe generator. Both the measurement controller 310 and the measurement collector 340 obtain end-to-end performance measurements from the servers 391.

FIG. 4 shows an exemplary system 400 for client-space network monitoring using a peer-to-peer architecture, in accordance with an embodiment of the present principles. The architecture of system 400 is particularly suitable for, but not limited to, master-slave-based clusters (e.g., MESOS®, HADOOP®, etc.), and so forth.

System 400 includes a measurement controller 410, a topology estimator 420, a network performance state estimator 430, and measurement collector 440. The elements 410, 420, and 430 of system 400 operate similarly to elements 210, 220, and 230, respectively, of system 200, but are configured in the peer-to-peer architecture along with the measurement collector 440, for performing monitoring of servers 491 in accordance with the teachings of the present principles.

In an embodiment, the measurement collector 440 can be and/or otherwise include one or more of the following: a local collector (sniff/probe); and a remote collector.

FIG. 5 shows a method 500 for client-space network utilization in a network having multiple nodes, in accordance with an embodiment of the present principles. In an embodiment, FIG. 5 includes at least portions of both method 600 of FIG. 6 and method 800 of FIG. 8. Thus, in an embodiment, step 510 can include portions of method 600 and step 520 can include portions of method 800.

At step 510, estimate a logical topology of the network by clustering source-destination node pairs from among the multiple nodes based on end-to-end performance measurements between various ones of the plurality of nodes.

At step 520, estimate a performance state of the network for an application based on end-to-end performance measurements.

At step 530, schedule and/or customize a workload within the network based on the logical topology and the performance state of the network.

In an embodiment, element 220/320/420 is implemented as an architecture-aware topology estimator 220/320/420 that captures similarity/de-similarity between end-to-end (e2e) performance measurements by clustering nodes according to typical data center network architecture using, for example, method 600.

FIG. 6 shows an exemplary method 600 for constructing a logical topology for connecting client nodes based on similarity/dissimilarity between end-to-end performance measurements, in accordance with an embodiment of the present principles. In an embodiment, method 600 is performed by the topology estimator 220/320/420.

At step 610, obtain a targeted network architecture (e.g., fat-tree, multi-rooted tree, Virtual Layer 2 (VL2), etc.) and parameters of the targeted network architecture, if any. Such parameters can include, for example, but are not limited to, the number of levels, k for a k-ary fat-tree, and so forth. In an embodiment, there can be multiple targeted architectures to infer topology at different layers (e.g., datacenter, rack, server, virtual machine (VM), and so forth).

At step 620, cluster source-destination pairs based on end-to-end performance measurements.

At step 630, construct a minimum logical topology and assign hosts to leaf nodes in the topology so that logical distances maximally correlate with the end-to-end performance measurements. For example, if (s1,d1) has a better connection than (s2,d2), then (s1,d1) is closer than (s2,d2) in the inferred topology, where s1 and s2 indicate respective sources/source nodes and d1 and d2 indicate respective destinations/destination nodes.

At step 640, discover parallel paths by (i) clustering fine-grained (per-packet) end-to-end measurements, and/or (ii) injecting traffic for source-destination pairs (s1, d1) and detecting (the absence of) congestion between other, related source-destination pairs (s2, d2), where s1 and s2 (d1 and d2) are siblings.

At step 650, augment the minimum topology to satisfy the targeted network architecture and its parameters (if given).

Figure 7:
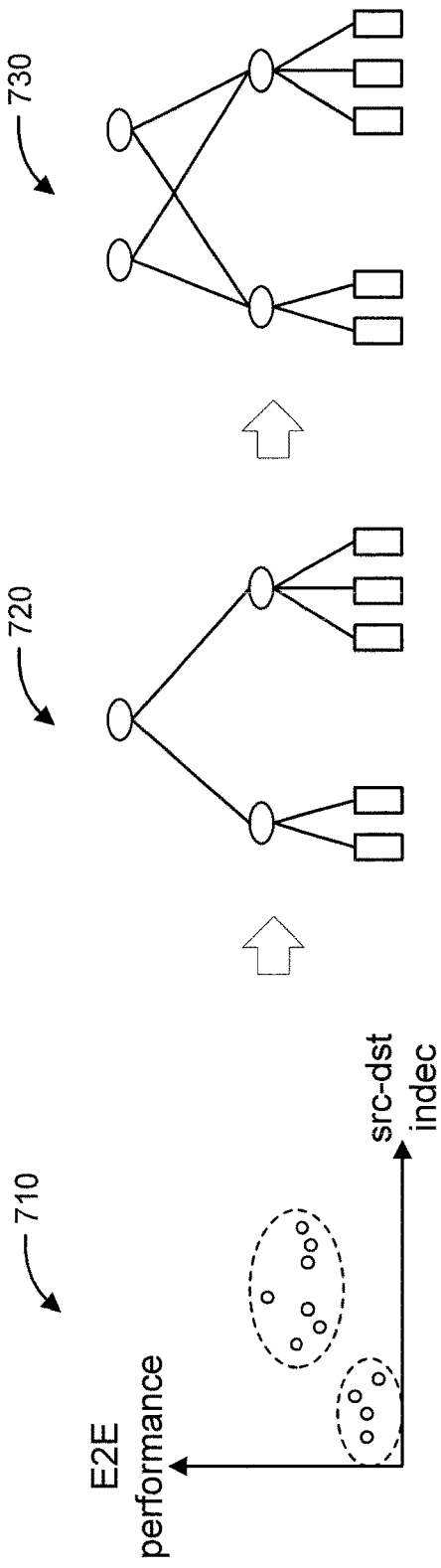
FIG. 7 shows an example 700 of method 600 of FIG. 6, in accordance with an embodiment of the present principles.

FIG. 7 shows an example 700 of method 600 of FIG. 6, in accordance with an embodiment of the present principles.

In the example 700, source-destination pairs can be clustered in step 620 with respect to a graph 710 of end-to-end performance versus a source-destination (src-dst) index. From a minimum logical topography 720, and minimum logical fat-tree topology 730 can be determined.

In an embodiment, element 230/330/430 is implemented as an application-aware network performance state estimator 230/330/430 that infers the performance of the minimum link groups from the end-to-end measurements, taking into account the importance of links to client applications, using, for example, method 800.

FIG. 8 shows an exemplary method 800 for inferring performance of minimum link groups from end-to-end measurements, considering the importance of client applications, in accordance with an embodiment of the present principles.

At step 810, identify relationships between end-to-end performance measurements and link performances (e.g., link 1 traversed by a packet between s and d with probability 25%), where the relationship may be identified from the topology of the network and routing protocol. Regarding the network topology, the inferred logical topology can used when the network topology is not explicitly provided. Regarding the routing protocol, a typical protocol can be inferred when the routing protocol is not provided explicitly. In an embodiment, an example typical routing protocol can be Open Shortest Path First (OSPF). Of course, other routing protocols can be used/inferred. Regarding the relationships, in an embodiment, such relationships can be probabilistic under load balancing (e.g., under Equal-Cost Multi-Path (ECMP) routing).

At step 820, compute the minimum link groups whose aggregate performance can be uniquely identified from the end-to-end performance measurements. In an embodiment, the computation of the minimum identifiable link groups takes into account load balancing.

At step 830, compute the weight for each link group based on per-link weights (determined from application traffic patterns). In an embodiment, the computed link weight reflects the importance of the link to client applications (e.g., betweeness centrality weighted by traffic a matrix).

At step 840, collect (passive and/or active) end-to-end measurements between host pairs (e.g., by the measurement controller). In an embodiment, for active measurements, the controller allocates measurement resources based on (i) link group weights and/or available passive measurements.

At step 850, infer the aggregate performance of the minimum link groups from the end-to-end performance measurements.

Figure 9:
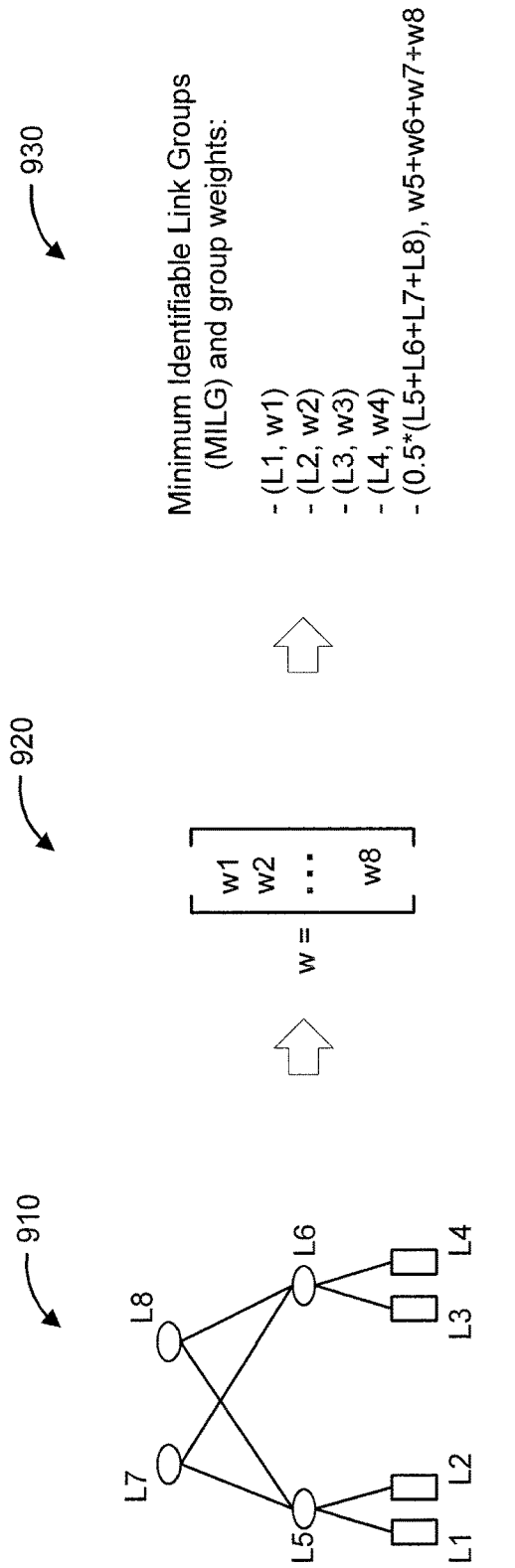
FIG. 9 shows an example 900 of method 800 of FIG. 8, in accordance with an embodiment of the present principles.

FIG. 9 shows an example 900 of method 800 of FIG. 8, in accordance with an embodiment of the present principles.

In the example, the input topology 910 can be used to determine the relationships between the end-to-end measurements and link performances. Link weights 920 computed for each link group based on per-link weights can be used to infer the minimum identifiable link groups (MILG) and group weights 930.

Thus, the present principles can advantageously provide frequent views of network state. Cloud clients, especially Infrastructure as a Service (IaaS) clients, can benefit from timely knowledge of network state. For example, having timely knowledge of the network congestion state can allow the client to perform network-aware workload scheduling/migration, predict response time of distributed computing jobs, and detect Service-Level Agreement (SLA) violations. Furthermore, the client knows best about when network state is needed, based on the semantics, history, and demand of its applications. Therefore, giving the client control of the measurements enables the client to perform on-demand measurements, and lets the client determine tradeoffs between measurement accuracy and overhead that provide the most utility.

Meanwhile, a cloud provider can also benefit from allowing a client to monitor network state. In addition to providing value-adding service to the client (self-monitoring as a service), the provider can also offload measurement cost to the client as measurement traffic generated by the client is treated as data traffic by the provider.

Another application scenario is ad hoc computing, where computing assets owned by different users are assembled in an ad hoc manner to provide a distributed computing cluster. In such an environment, the capability of client-space network monitoring is crucial to provide each client a global view of the cluster for optimized workload scheduling.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 10:
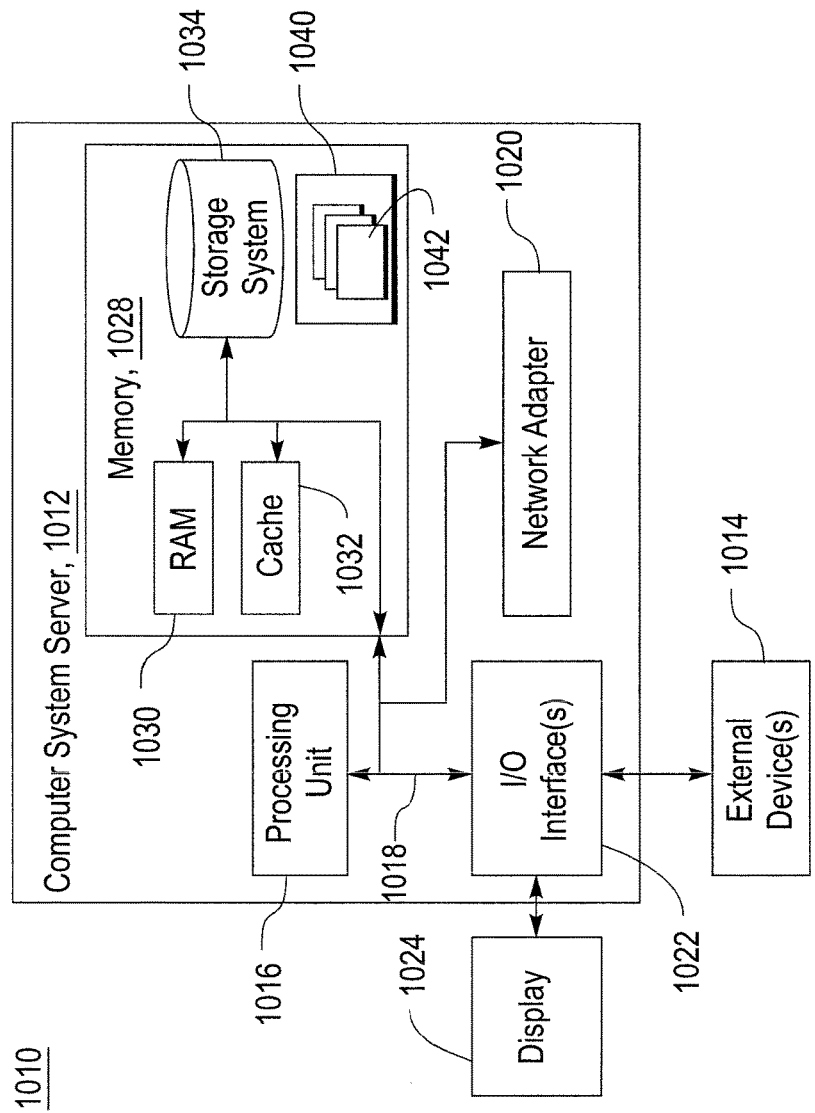
FIG. 10 shows an exemplary cloud computing node 1010, in accordance with an embodiment of the present principles.

Referring now to FIG. 10, a schematic of an example of a cloud computing node 1010 is shown. Cloud computing node 1010 is only one example of a suitable cloud computing node and is not intended to suggest any limitation as to the scope of use or functionality of embodiments of the invention described herein. Regardless, cloud computing node 1010 is capable of being implemented and/or performing any of the functionality set forth hereinabove.

In cloud computing node 1010 there is a computer system/server 1012, which is operational with numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1012 in cloud computing node 1010 is shown in the form of a general-purpose computing device. The components of computer system/server 1012 may include, but are not limited to, one or more processors or processing units 1016, a system memory 1028, and a bus 1018 that couples various system components including system memory 1028 to processor 1016.

Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1012 typically includes a variety of computer system readable media. Such media may be any available media that is accessible by computer system/server 1012, and it includes both volatile and non-volatile media, removable and non-removable media.

System memory 1028 can include computer system readable media in the form of volatile memory, such as random access memory (RAM) 1030 and/or cache memory 1032. Computer system/server 1012 may further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, memory 1028 may include at least one program product having a set (e.g., at least one) of program modules that are configured to carry out the functions of embodiments of the invention.

Program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer system/server 1012 may also communicate with one or more external devices 1014 such as a keyboard, a pointing device, a display 1024, etc.; one or more devices that enable a user to interact with computer system/server 1012; and/or any devices (e.g., network card, modem, etc.) that enable computer system/server 1012 to communicate with one or more other computing devices. Such communication can occur via Input/Output (I/O) interfaces 1022. Still yet, computer system/server 1012 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, external disk drive arrays, RAID systems, tape drives, and data archival storage systems, etc.

Figure 11:
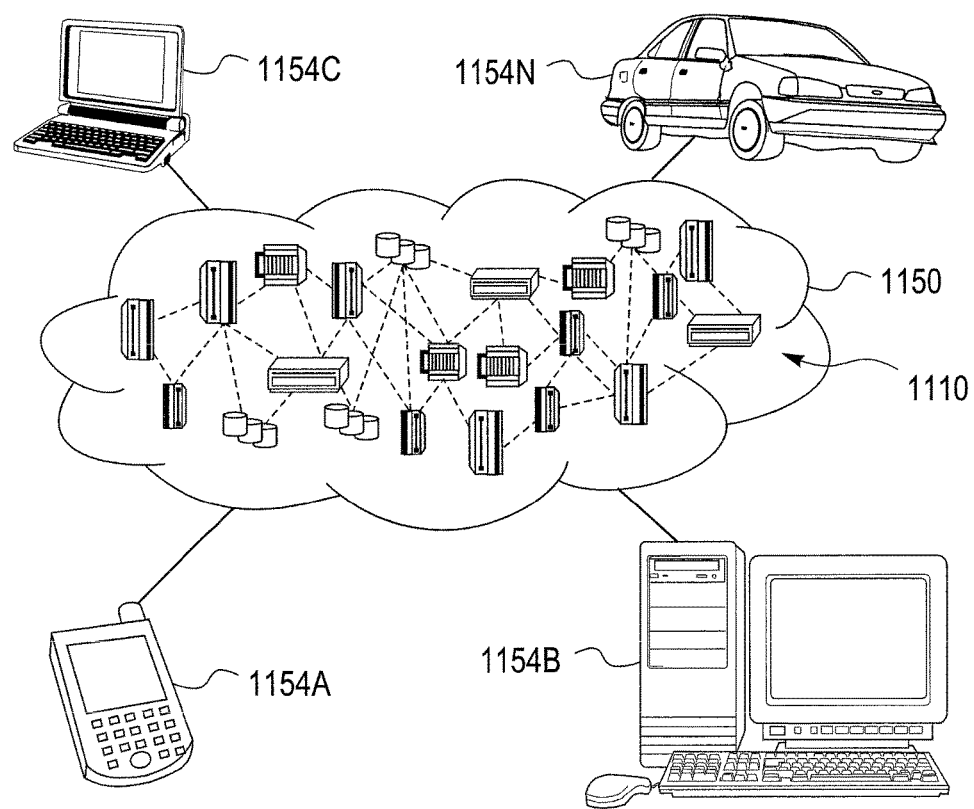
FIG. 11 shows an exemplary cloud computing environment 1150, in accordance with an embodiment of the present principles.

Referring now to FIG. 11, illustrative cloud computing environment 1150 is depicted. As shown, cloud computing environment 1150 comprises one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
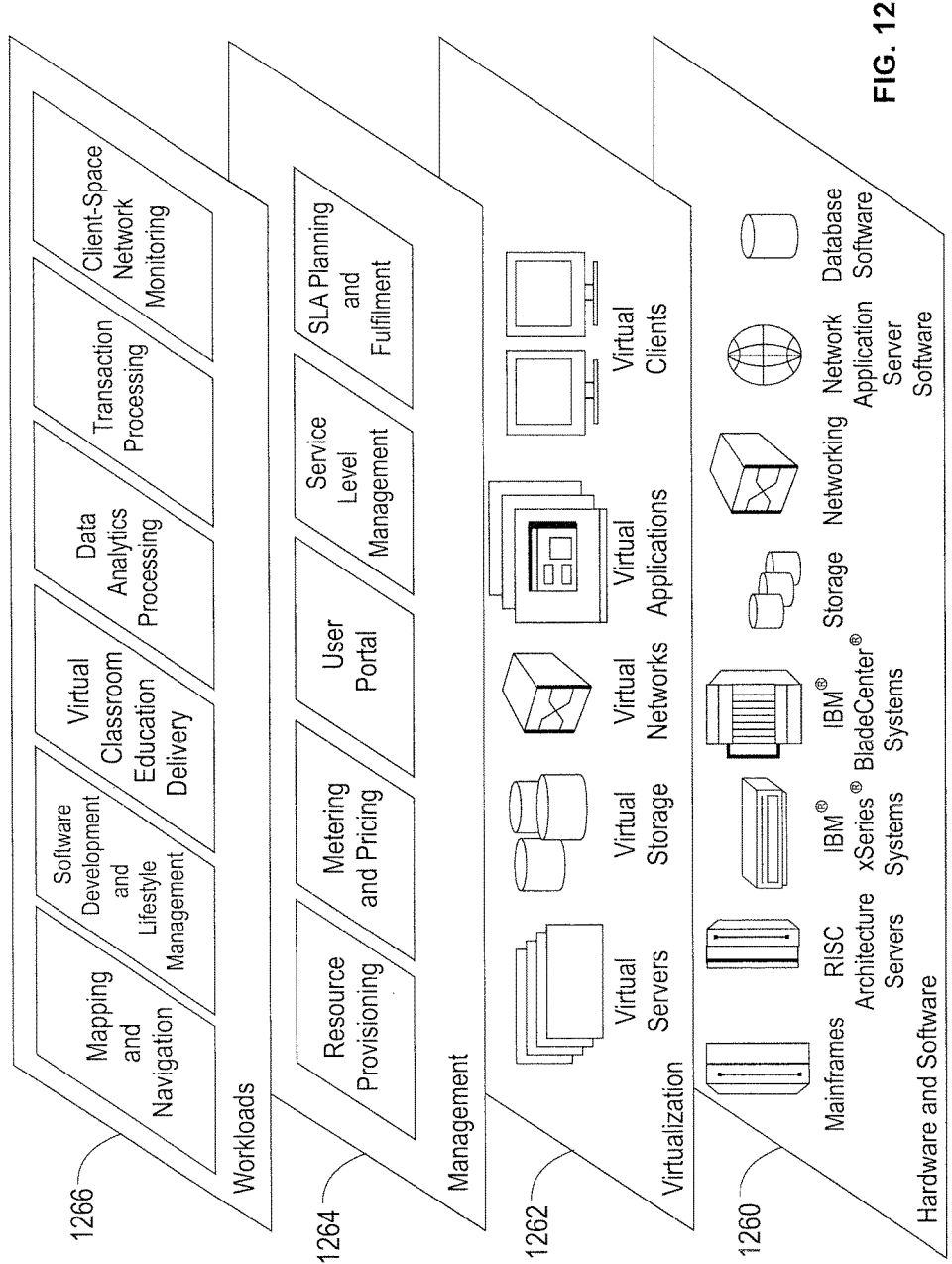
FIG. 12 shows exemplary abstraction model layers, in accordance with an embodiment of the present principles.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1262 provides an abstraction layer from which the following examples of virtual entities may be provided: virtual servers; virtual storage; virtual networks, including virtual private networks; virtual applications and operating systems; and virtual clients.

In one example, management layer 1264 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1266 provides examples of functionality for which the cloud computing environment may be utilized. Examples of workloads and functions which may be provided from this layer include: mapping and navigation; software development and lifecycle management; virtual classroom education delivery; data analytics processing; transaction processing; and client-space network monitoring.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for client-side monitoring in a cloud provider environment comprising a network having a plurality of nodes, the method comprising:
   estimating a logical topology of the network by clustering source-destination node pairs while excluding intermediate nodes from among the plurality of nodes based on end-to-end performance measurements between various ones of the plurality of nodes forming the source-destination node pairs;
   estimating a performance state of the network for a client application based on end-to-end performance measurements; and
   at least one of scheduling and customizing a workload within the network, and executing the workload within the network, based on the estimated logical topology and the estimated performance state of the network.

2. The computer-implemented method of claim 1, wherein estimating the logical topology of the network comprises:
   obtaining a targeted network architecture for the network;
   clustering the source-destination pairs formed by the plurality of nodes into at least two clusters based on end-to-end performance measurements between the source nodes and the destination nodes;

estimating a minimum logical network topology and assigning the source nodes and the destination nodes from the pairs to nodes in the minimum logical topology based on clustering results from the end-to-end performance measurements; and augmenting the minimum logical topology to satisfy the targeted network architecture.

3. The computer-implemented method of claim 2, wherein said obtaining step comprises obtaining multiple targeted architectures, each with different numbers of levels, to obtain a multi-resolution topology inference.

4. The computer-implemented method of claim 1, wherein estimating the performance state of the network comprises:

identifying a performance-measurement-to-link relationship between end-to-end performance measurements and link performances, the end-to-end performance measurements being for various pairings of the plurality of nodes;

computing minimum link groups whose aggregate performances can be uniquely identified from the end-to-end performance measurements based on the relationship;

computing weights for each of the minimum link groups based on application-specified per-link weights;

collecting the end-to-end performance measurements between the various pairings of the plurality of nodes; and inferring an aggregate performance state of each of the minimum link groups.

5. A non-transitory article of manufacture tangibly embodying a computer readable program which when executed causes a computer to perform the steps of claim 1.

6. The computer-implemented method of claim 1, wherein the logical topology is estimated to have logical distances in the logical topology that maximally correlate with the end-to-end performance measurements such that a given one of the source-destination node pairs having a better connection than another one of the source-destination node pairs has a given constituent source node closer to a given constituent destination node in the logical topology than the other one of the source-destination node pairs.

\* \* \* \* \*